United States Patent
Reddy et al.

(10) Patent No.: US 9,909,055 B2
(45) Date of Patent: Mar. 6, 2018

(54) COMPOSITION OF A DEGRADABLE DIVERTING AGENT AND A DEGRADABLE ACCELERATOR WITH TUNABLE DEGRADABLE RATE

(71) Applicant: Halliburton Energy Services, Inc., Houston, TX (US)

(72) Inventors: B. Raghava Reddy, The Woodlands, TX (US); Janette Cortez, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/302,089

(22) PCT Filed: May 22, 2014

(86) PCT No.: PCT/US2014/039146
§ 371 (c)(1),
(2) Date: Oct. 5, 2016

(87) PCT Pub. No.: WO2015/178909
PCT Pub. Date: Nov. 26, 2015

(65) Prior Publication Data
US 2017/0121589 A1  May 4, 2017

(51) Int. Cl.
| E21B 43/16 | (2006.01) |
| E21B 43/25 | (2006.01) |
| C09K 8/62 | (2006.01) |
| C09K 8/035 | (2006.01) |
| C09K 8/42 | (2006.01) |
| E21B 43/26 | (2006.01) |
| E21B 43/267 | (2006.01) |

(52) U.S. Cl.
CPC ............ *C09K 8/62* (2013.01); *C09K 8/035* (2013.01); *C09K 8/42* (2013.01); *E21B 43/16* (2013.01); *E21B 43/26* (2013.01); *E21B 43/267* (2013.01)

(58) Field of Classification Search
None
See application file for complete search history.

(56) References Cited

U.S. PATENT DOCUMENTS

| 4,107,057 A | 8/1978 | Dill et al. |
| 7,565,929 B2 | 7/2009 | Bustos et al. |
| 7,779,915 B2 | 8/2010 | Hutchins et al. |

(Continued)

OTHER PUBLICATIONS

Bader; "Applications of Schiff's Bases Chelates in Quantitative Analysis: A Review"; Rasayan Journal of Chemistry; vol. 3, No. 4; 2010; p. 660-670; <http://www.rasayanjournal.com>.*

(Continued)

*Primary Examiner* — Angela M DiTrani
*Assistant Examiner* — Andrew Sue-Ako
(74) *Attorney, Agent, or Firm* — Craig Roddy; Baker Botts L.L.P.

(57) ABSTRACT

Methods and compositions for a treatment fluid composition are disclosed for use within a subterranean formation, comprising: a degradable diverting agent, and a Schiff base comprising a degradation accelerator. The treatment fluid may be introduced into a formation and the Schiff base allowed to hydrolytically release the degradation accelerator, allowing the degradation accelerator to degrade the degradable diverting agent.

14 Claims, 3 Drawing Sheets

(56) References Cited

U.S. PATENT DOCUMENTS

| | | |
|---|---|---|
| 7,841,411 B2 | 11/2010 | Fuller et al. |
| 7,858,561 B2 | 12/2010 | Abad et al. |
| 7,896,068 B2 | 3/2011 | Lee |
| 2008/0093073 A1 | 4/2008 | Bustos et al. |
| 2008/0149335 A1 | 6/2008 | Lee |
| 2008/0210423 A1 | 9/2008 | Boney |
| 2008/0289828 A1 | 11/2008 | Hutchins et al. |
| 2009/0075845 A1 | 3/2009 | Abad et al. |
| 2009/0105097 A1 | 4/2009 | Abad et al. |
| 2009/0151944 A1 | 6/2009 | Fuller et al. |
| 2010/0273685 A1 | 10/2010 | Saini et al. |
| 2010/0323932 A1 | 12/2010 | Bustos et al. |
| 2011/0030958 A1 | 2/2011 | Fedorov et al. |
| 2011/0120712 A1 | 5/2011 | Todd et al. |
| 2011/0139466 A1* | 6/2011 | Chen .................. C08G 65/48 166/387 |
| 2011/0284222 A1 | 11/2011 | Chaabouni et al. |
| 2013/0168096 A1 | 7/2013 | Parkhonyuk et al. |
| 2013/0292123 A1 | 11/2013 | Murphree et al. |
| 2014/0116701 A1 | 5/2014 | Tang |
| 2014/0116703 A1 | 5/2014 | Reddy et al. |
| 2014/0116704 A1 | 5/2014 | Reddy et al. |

OTHER PUBLICATIONS

International Preliminary Report on Patentability issued in related Application No. PCT/US2014/039146, dated Dec. 1, 2016 (8 pages).
Office Action issued in related Australian Application No. 2014395086, dated Nov. 15, 2016 (4 pages).
International Search Report and Written Opinion issued in related PCT Application No. PCT/US2014/039146 dated Feb. 24, 2015, 12 pages.

* cited by examiner

COMPOSITION OF A DEGRADABLE DIVERTING AGENT AND A DEGRADABLE ACCELERATOR WITH TUNABLE DEGRADABLE RATE

CROSS-REFERENCE TO RELATED APPLICATION

The present application is a U.S. National Stage Application of International Application No. PCT/US2014/039146 filed May 22, 2014, which is incorporated herein by reference in its entirety for all purposes.

BACKGROUND

The present disclosure relates to methods and systems for use in subterranean operations. More particularly, the present disclosure relates to methods and systems of using treatment chemicals in a wellbore.

Hydrolytically degradable polymers (generally aliphatic polyesters) have been used in a variety of applications in the oil field, such as fluid diversion, fluid-loss control, and filter-cake-removal applications. In general, diverting agents and fluid-loss-control materials are intended to function for a finite amount of time.

Generally, diversion operations are used to distribute treatment fluid uniformly over all of the treated zones, which can become difficult as the permeability contrast between treated zones increases. Examples of treatment fluids include acids, scale inhibitors, or fracturing fluids. A number of particulate diverting agents have been used commercially in diverting fluids. Examples of such materials include cellophane flakes, naphthalenes, crushed limestone, sodium tetraborate, oyster shells, gilsonite, paraformaldehyde, and rock salt. The removal of diverting agents after completion of an operation has, for example, included dissolving the particulate diverting agent with a secondary treatment fluid.

Recently, aliphatic polyester-based diverting agents have been used based on their ability to self-degrade in any aqueous fluid, whether acidic, neutral, or basic. These diverting agents can be produced in a variety of shapes, such as granules or flakes, and are considered environmentally benign, where flowback fluids containing degraded byproducts are nontoxic. For example, polylactic acid (PLA), a degradable polymer with increasing use as a diverting agent, through hydrolytic degradation produces lactic acid, which occurs naturally in the human body.

Degradation accelerators are generally used to aid degrading the diverting agent into corresponding benign byproducts. However, these degradation accelerators are typically liquids and/or water soluble. As a result, degradation accelerator treatments must be pumped as a separate treatment fluid stream after completing a diversion operation, can require additional equipment, time, and/or other resources that add complexity and decrease operation efficiency.

BRIEF DESCRIPTION OF THE DRAWINGS

These drawings illustrate certain aspects of some of the embodiments of the present disclosure, and should not be used to limit or define the disclosure.

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

DETAILED DESCRIPTION

The present disclosure relates to methods and systems for use in subterranean operations. More particularly, the present disclosure relates to methods and systems of using treatment chemicals in a wellbore.

Figure 1:
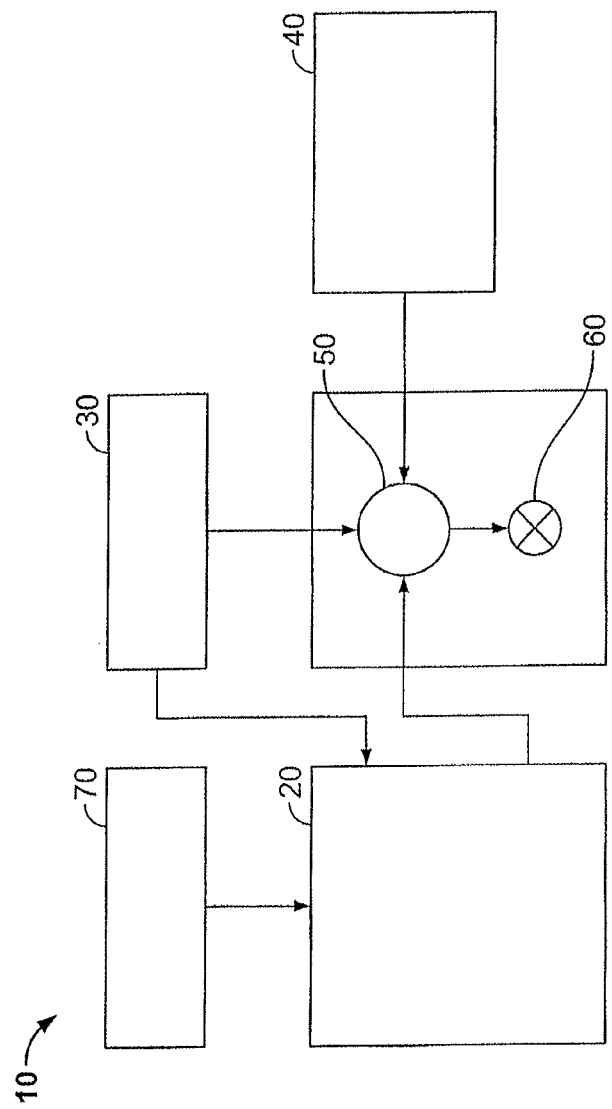
FIG. 1 is a diagram illustrating an example of a fracturing system that may be used in accordance with certain embodiments of the present disclosure.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
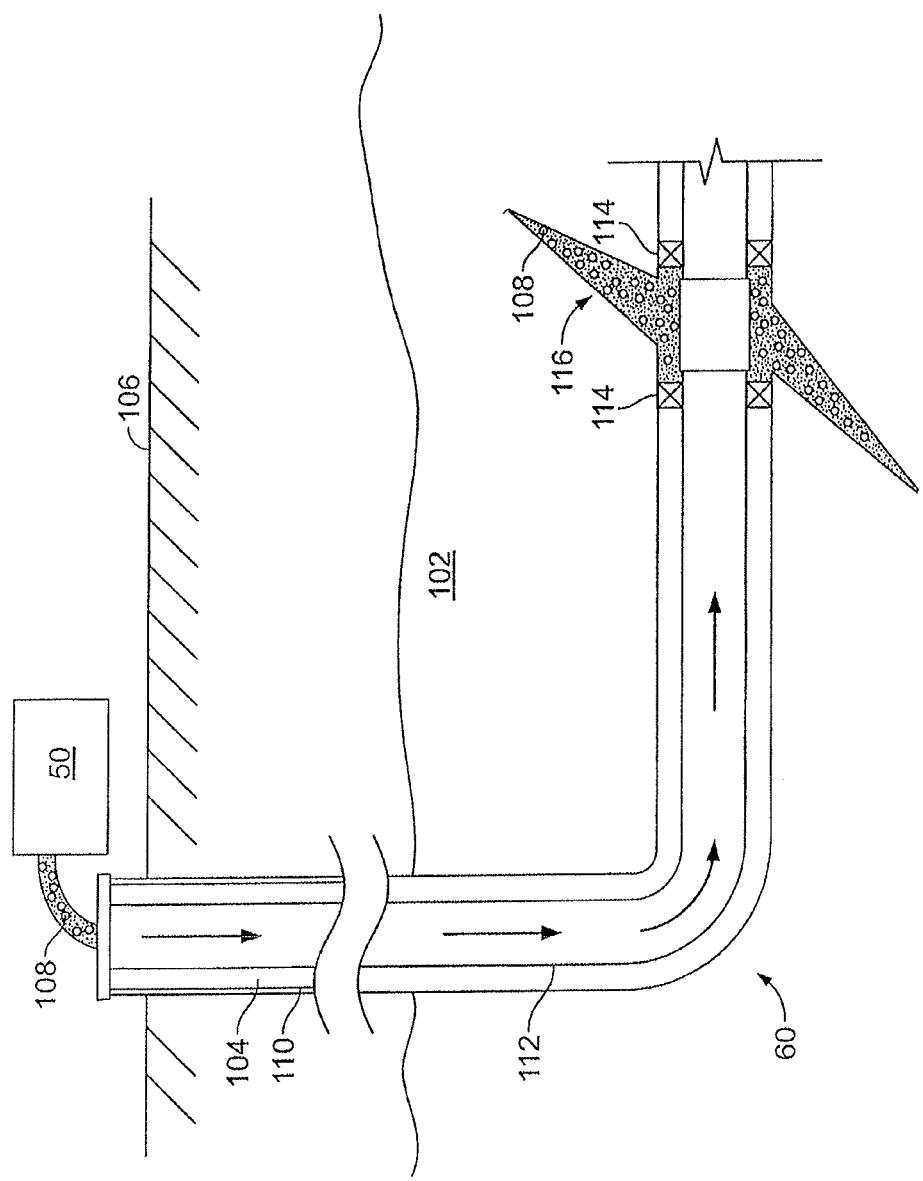
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

The methods and compositions of the present disclosure involve the formation and/or use of a treatment fluid comprising a degradable diverting agent and a degradation accelerator. In certain embodiments, the treatment fluid may further comprise water. The degradable diverting agent and the degradation accelerator may be blended as a solid diverting agent composite in the treatment fluid. In certain embodiments, the treatment fluid may be a fracturing fluid.

In certain embodiments, the degradable diverting agents suitable for use in the methods and systems of the present disclosure may be of an appropriate size to enter the far-field area of a subterranean formation. In certain embodiments, the average particle size of the diverting agent may range from about 1 micron to about 600 microns. In certain embodiments, the average particle size of the diverting agent may be about 100 mesh, U.S. Sieve Series.

Diverting agents may be introduced into the subterranean formation in a treatment fluid, and may be included in treatment fluids in any suitable concentration. In certain embodiments, the diverting agents may be provided at the well site in a slurry that is mixed into the base fluid of the treatment fluid as the fluid is pumped into a well bore. In certain embodiments, the concentration of diverting agent in the treatment fluid may range from about 0.01 lbs per gallon to about 1 lbs per gallon. In certain embodiments, the concentration of diverting agent in the treatment fluid may range from about 0.1 lbs per gallon to about 0.3 lbs per gallon. In certain embodiments, the total amount of diverting agent used for a particular stage of an operation may range from about 1000 lbs to about 5000 lbs. A person of skill in the art with the benefit of this disclosure will recognize the appropriate amount of diverting agent to use in an application of the present disclosure based on, among other things, the type of formation, the particle size of the diverting agent, the parameters of the operation, desired fracture geometries, and the like.

The diverting agents used in the methods and systems of the present disclosure may comprise any particulate material capable of altering some or all of the flow of a substance away from a particular portion of a subterranean formation to another portion of the subterranean formation or, at least in part, ensure substantially uniform injection of a treatment fluid (e.g., a fracturing fluid) over the region of the subterranean formation to be treated. Diverting agents may, for example, selectively enter more permeable zones of a subterranean formation, where they may create a relatively impermeable barrier across the more permeable zones of the formation (including by bridging one or more fractures), thus serving to divert a subsequently introduced fracturing fluid into the less permeable portions of the formation. Examples of particulate diverting materials that may be suitable for use in certain embodiments of the present disclosure may include, but are not limited to, naphthalene, clean tar, starch, moth balls, naphthalinic flakes, wax beads, boric oxide; derivatives of the foregoing; and combinations of any of the foregoing. In certain embodiments, the proppants used in the methods and systems of the present disclosure may serve a dual purpose as both a proppant particulate (i.e., preventing fractures from fully closing upon the release of the hydraulic pressure, forming conductive channels through which fluids may flow to a well bore) and as a diverting agent. Such dual-purpose particulates may be referred to herein as "self-diverting" proppants.

In certain embodiments, a diverting agent's diverting effects may be temporary. For example, a degradable and/or soluble diverting agent may be used such that it degrades or dissolves, for example, after a period of time in the subterranean formation or when contacted by a particular fluid or fluids. Examples of degradable diverting agents that may be suitable for use in certain embodiments of the present disclosure include, but are not limited to, fatty alcohols, fatty acid salts, fatty esters, proteinous materials, degradable polymers, and the like. Suitable examples of degradable polymers that may be used in accordance with the present disclosure include, but are not limited to, homopolymers, random, block, graft, and star- and hyper-branched polymers. Specific examples of suitable polymers include polysaccharides such as dextran or cellulose; chitin; chitosan; proteins; aliphatic polyesters; poly(lactide); poly(glycolide); poly(ε-caprolactone); poly(hydroxybutyrate); poly(anhydrides); aliphatic polycarbonates; poly(acrylamide); poly (ortho esters); poly(amino acids); poly(ethylene oxide); and polyphosphazenes. Polyanhydrides are another type of degradable polymers that may be suitable for use as degradable diverting agents in the present disclosure. Examples of polyanhydrides that may be suitable include poly(adipic anhydride), poly(suberic anhydride), poly(sebacic anhydride), and poly(dodecanedioic anhydride). Other suitable examples include but are not limited to poly(maleic anhydride) and poly(benzoic anhydride).

The degradable diverting agent may comprise a degradable aliphatic polymer. In certain embodiments, the degradable diverting agent may comprise a polyester. In certain embodiments, the diverting agent may comprise polylactic acid (PLA).

The degradation accelerator may comprise a polyamine. In certain embodiments, the degradation accelerator may comprise monomeric and/or oligomeric polyamines. In certain embodiments, the degradation accelerator may have the general chemical formula $NH_2$—R—$NH_2$. For example, the degradation accelerator may comprise ethylene diamine, triethylenetetramine, or tetraethylene pentaamine.

In certain embodiments, the degradation accelerator may be reacted with an insolubilizing agent to create a water insoluble degradation accelerator. In certain embodiments, The water insoluble degradation accelerator may be in a solid state at 200° F. In certain embodiments, the water insoluble degradation accelerator may comprise a Schiff base. For example, the polyamine may be reacted with a carbonyl compound to form a Schiff base by loss of water molecules, as shown by example in Equation 1:

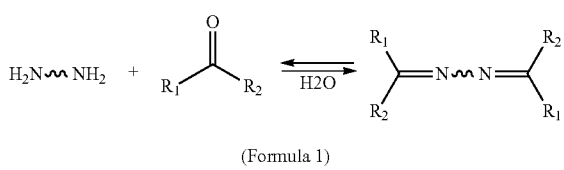

(Equation 1)

(Formula 1)

The resulting Schiff base may be a water insoluble solid, comprising the degradation accelerator. The water insoluble degradation accelerator may also be referred to as an inactive degradation accelerator. In certain embodiments, the Schiff base may hydrolyze back to the polyamine and the carbonyl compound in the presence of dilute acid and/or under neutral conditions. In certain embodiments, the carbonyl compound may comprise aldehydes and/or ketones. If an aldehyde is used as the to react with the polyamine, the resulting Schiff base may comprise a single R group at each end, while reacting a ketone with the polyamine may result in a Schiff base comprising two R groups at each end, shown by example as Formula 1. In certain embodiments, the water insoluble degradation accelerator may be bis salicylidene ethylene diamine, available from Sigma Aldrich Chemical Co., the structure of which is shown in Formula 2:

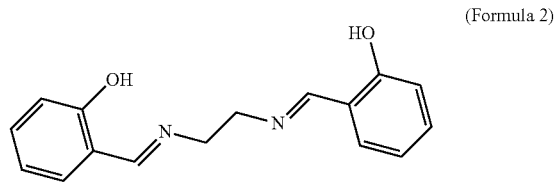 [SMILES: Oc1ccccc1/C=N/CC/N=C/c1ccccc1O]

(Formula 2)

Hydrolysis of the Schiff base may release the degradation accelerator, which may comprise polyamine. For example, hydrolysis of bis salicylidene ethylene diamine may generate an ethylene diamine. Once released, the degradation accelerator may solubilize in the treatment fluid and interact with the degradable diverting agent to accelerate degradation of the degradable diverting agent. For example, in certain embodiments, the polyamine may degrade the PLA through aminolysis and/or base-mediated hydrolysis.

In certain embodiments, the degradable diverting agent may be physically blended with the water insoluble degradation accelerator to form a solid diverting agent composite. The solid diverting agent composite comprising degradable diverting agent and degradation accelerator may be placed in a treatment fluid and used to treat a wellbore. Once in the treatment fluid, the water insoluble degradation accelerator may hydrolyze over time to generate the degradation accelerator. Once generated and made available within the treatment fluid, the degradation accelerator may interact with the diverting agent to accelerate the degradation of the diverting agent. In some other embodiments, the degradable diverting agent may be melt-blended with the water insoluble degradation accelerator to form a solid diverting agent composite As such, the solid diverting agent composite may include the degradation accelerator treatment at the time of the diversion operation. This may allow a diversion operation to be conducted through a single wellbore treatment instead of requiring a diverting agent treatment to be followed by a separate degradation accelerator treatment.

The particular concentration of degradation accelerator in solid diverting agent composite may be adjusted according to the requirements of the diversion operation. In certain embodiments, the solid diverting agent composite may comprise between about 1% to about 50% degradation accelerator by weight. For example, in certain embodiments, the solid diverting agent composite may comprise between about 5% to about 40% degradation accelerator by weight; or between about 10% to about 25% degradation accelerator by weight. For example, the concentration of degradation accelerator may be decreased to provide a slower degradation timeline or increased to provide a faster degradation timeline. In certain embodiments, the degradation accelerator may be in about a 1:1 molar ratio with the degradable diverting agent in the solid diverting agent composite.

The treatment fluids of the present disclosure may comprise any fluid used for one or more treatments and/or operations in at least a portion of a subterranean formation. Examples of such treatment fluids include, but are not limited to, fracturing fluids, drilling fluids, gravel packing fluids, acidizing fluids, completion fluids, workover fluids, cementing fluids, and the like.

The treatment fluids of the present disclosure may comprise any aqueous fluid, non-aqueous fluid, or combination thereof known in the art. Aqueous fluids that may be suitable for use in the methods and systems of the present disclosure may comprise water from any source, provided that it does not contain compounds that adversely affect other components of the treatment fluid. Such aqueous fluids may comprise fresh water, salt water (e.g., water containing one or more salts dissolved therein), brine (e.g., saturated salt water), seawater, or any combination thereof. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of gelling agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the treatment fluids may comprise a mixture of one or more fluids and/or gases, including but not limited to emulsions, foams, and the like.

The proppants used in the methods and systems of the present disclosure may comprise any particulate capable of being deposited in one or more of the fractures in the formation (whether created, enhanced, and/or pre-existing). Examples of proppant particulates that may be suitable for use include, but are not limited to: bubbles or microspheres, such as made from glass, ceramic, polymer, sand, and/or another material. Other examples of proppant particulates may include particles of any one or more of: calcium carbonate ($CaCO_3$); barium sulfate ($BaSO_4$); organic polymers; cement; boric oxide; slag; sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and combinations thereof. Suitable composite particulates may comprise a binder and a filler material wherein suitable filler materials may include any one or more of: silica; alumina; fumed carbon; carbon black; graphite; mica; titanium dioxide; meta-silicate; calcium silicate; kaolin; talc; zirconia; boron; fly ash; hollow glass microspheres; solid glass; and combinations thereof. In certain embodiments, the proppant particulates may be at least partially coated with one or more substances such as tackifying agents, silyl-modified polyamide compounds, resins, crosslinkable aqueous polymer compositions, polymerizable organic monomer compositions, consolidating agents, binders, or the like.

The proppant particulates may be of any size and/or shape suitable for the particular application in which they are used. In certain embodiments, the proppant particulates used may have a particle size in the range of from about 2 to about 400 mesh, U.S. Sieve Series. In certain embodiments, the proppant may comprise graded sand having a particle size in the range of from about 10 to about 70 mesh, U.S. Sieve Series. Preferred sand particle size distribution ranges may be one or more of 10-20 mesh, 20-40 mesh, 30-50 mesh, 40-60 mesh or 50-70 mesh, depending on, for example, the fracture geometries of the formation, the location in the formation where the proppant particulates are intended to be placed, and other factors. In certain embodiments, a combination of proppant particulates having different particle sizes, particle size distributions, and/or average particle sizes may be used. In certain embodiments, proppant particulates of different particle sizes, particle size distributions, and/or average particle sizes may be used in different stages of proppant-carrying fluid in a single fracturing operation. For example, earlier stages of proppant-carrying fluid may include smaller proppant particulates that can enter the narrower tip regions of fractures in the formation, while larger proppant particulates may be used in subsequent stages that may be deposited in the fracture without approaching the tip regions.

In certain embodiments, the treatment fluids used in the methods and systems of the present disclosure optionally may comprise one or more gelling agents, which may comprise any substance that is capable of increasing the viscosity of a fluid, for example, by forming a gel. In certain embodiments, the gelling agent may viscosify an aqueous fluid when it is hydrated and present at a sufficient concentration. Examples of gelling agents that may be suitable for use in accordance with the present disclosure include, but are not limited to guar, guar derivatives (e.g., hydroxyethyl guar, hydroxypropyl guar, carboxymethyl guar, carboxymethylhydroxyethyl guar, and carboxymethylhydroxypropyl guar ("CMHPG")), cellulose, cellulose derivatives (e.g., hydroxyethyl cellulose, carboxyethylcellulose, carboxymethylcellulose, and carboxymethylhydroxyethylcellulose), biopolymers (e.g., xanthan, scleroglucan, diutan, etc.), starches, chitosans, clays, polyvinyl alcohols, acrylamides, acrylates, viscoelastic surfactants (e.g., methyl ester sulfonates, hydrolyzed keratin, sulfosuccinates, taurates, amine oxides, ethoxylated amides, alkoxylated fatty acids, alkoxylated alcohols, ethoxylated fatty amines, ethoxylated alkyl amines, betaines, modified betaines, alkylamidobetaines, etc.), combinations thereof, and derivatives thereof. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound. In certain embodiments, the gelling agent may be "crosslinked" with a crosslinking agent, among other reasons, to impart enhanced viscosity and/or suspension properties to the fluid. The gelling agent may be included in any concentration sufficient to impart the desired viscosity and/or suspension properties to the aqueous fluid. In certain embodiments, the gelling agent may be included in an amount of from about 0.1% to about 10% by weight of the aqueous fluid. In other exemplary embodiments, the gelling agent may be present in the range of from about 0.1% to about 2% by weight of the aqueous fluid.

In certain embodiments, the treatment fluids used in the methods and systems of the present disclosure optionally may comprise any number of additional additives, among other reasons, to enhance and/or impart additional properties of the composition. For example, the compositions of the present disclosure optionally may comprise one or more salts, among other reasons, to act as a clay stabilizer and/or enhance the density of the composition, which may facilitate its incorporation into a treatment fluid. In certain embodiments, the compositions of the present disclosure optionally may comprise one or more dispersants, among other reasons, to prevent flocculation and/or agglomeration of the solids while suspended in a slurry. Other examples of such additional additives include, but are not limited to, salts, surfactants, acids, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application.

The treatment fluids used in the methods and systems of the present disclosure may be prepared using any suitable method and/or equipment (e.g., blenders, stirrers, etc.) known in the art at any time prior to their use. In some embodiments, the treatment fluids may be prepared at a well site or at an offsite location. In certain embodiments, an aqueous fluid may be mixed the gelling agent first, among other reasons, in order to allow the gelling agent to hydrate and form a gel. Once the gel is formed, proppants and/or diverting agents may be mixed into the gelled fluid. Once prepared, a treatment fluid of the present disclosure may be placed in a tank, bin, or other container for storage and/or transport to the site where it is to be used. In other embodiments, a treatment fluid of the present disclosure may be prepared on-site, for example, using continuous mixing or "on-the-fly" methods, as described below.

Certain embodiments may comprise providing a treatment fluid, comprising a degradable diverting agent, and a Schiff base comprising a degradation accelerator; introducing the treatment fluid into a formation; allowing the Schiff base to hydrolytically release the degradation accelerator; and allowing the degradation accelerator to degrade the degradable diverting agent.

Certain embodiments may comprise providing a degradable diverting agent; mixing the degradable diverting agent with a solid Schiff base comprising degradation accelerator to form a treatment fluid; introducing the treatment fluid comprising the degradable diverting agent and the solid Schiff base into the wellbore; allowing the solid Schiff base to hydrolyze within the wellbore, releasing the degradation accelerator; and allowing the degradation accelerator to degrade the diverting agent.

To facilitate a better understanding of the present disclosure, the following example of certain aspects of some embodiments are given. In no way should the following example be read to limit, or define, the entire scope of the claims or disclosure.

EXAMPLE

Figure 3:
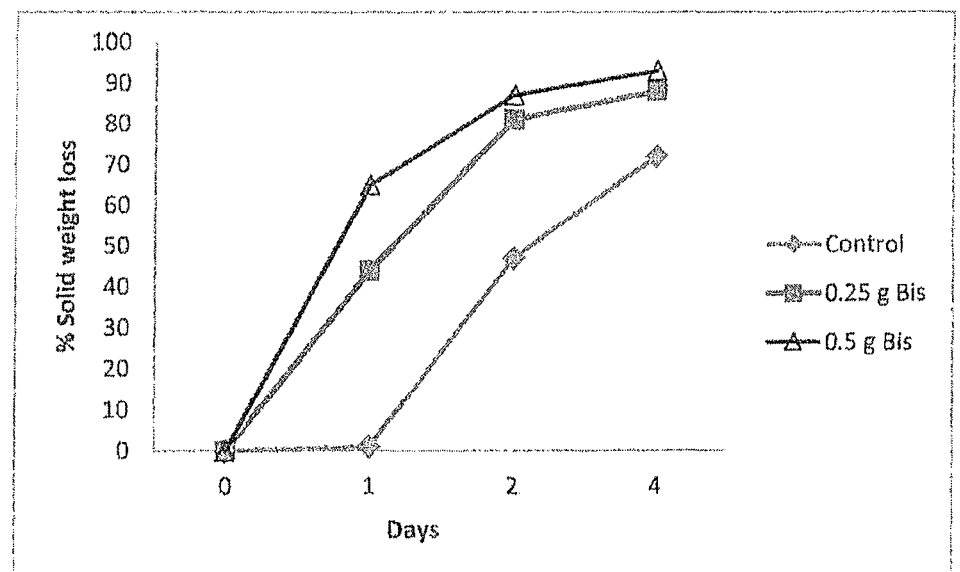
FIG. 3 is a chart illustrating the results of an example degradation in accordance with certain embodiments of the present disclosure.

Ethylene diamine was converted into a Schiff base by reaction with salicylaldehyde to form bis-salicylidene ethylene diamine (BSEDA). The BSEDA was then mixed with solid polylactide diverting agent (40-100 mesh) in a variable weight ratio to create a solid mixture. The solid mixture comprising BSEDA and degradable diverting agent was allowed to degrade in tap water without pH adjustment at 200 degrees Fahrenheit. The degradation rates were measured by periodically filtering the test mixture, allowing the solid precipitate to dry, and measuring the dry weight. The dry weight divided by the original solid weight is expressed as percent degradation, which includes percent diverter agent degradation as well as percent Schiff base (water insolubilized degradation accelerator) consumed. The degradation results are shown in Table 1 and with percent degradations rates in FIG. 3 (where "bis" in the legend for FIG. 3 refers to BSEDA).

TABLE 1

|  | 0 day | 1 day | 2 days | 4 days |
|---|---|---|---|---|
| Control | 1.00 g | 0.99 g | 0.53 g | 0.28 g |
| 0.25 g BSEDA + 1.0 g PLA | 1.25 g | 0.70 g | 0.24 g | 0.152 g |
| 0.5 g BSEDA + 1.0 g PLA | 1.50 g | 0.53 g | 0.20 g | 0.104 g |

As a result, degradation of the diverting agent was enhanced in the presence of solid, water insoluble degradation accelerator. For example, after one day, the PLA in only water degraded 1%. PLA mixed with 25% solid BSEDA by weight of PLA resulted in a 44% degradation of the PLA and BSEDA degradation accelerator solid composite after one day. The solid composite comprising PLA and 50% solid BSEDA by weight of PLA reached a 65% degradation of the solid composite after one day.

In certain embodiments a method may comprise providing a treatment fluid comprising a degradable diverting agent and a Schiff base comprising a degradation accelerator; introducing the treatment fluid into a formation; allowing the Schiff base to hydrolytically release the degradation accelerator; and allowing the degradation accelerator to degrade the degradable diverting agent.

In certain embodiments, a method of treating a wellbore may comprise providing a degradable diverting agent; mixing the degradable diverting agent with a solid Schiff base comprising degradation accelerator to form a solid diverting agent composite; adding the solid diverting agent composite to a treatment fluid and introducing the treatment fluid into the wellbore; allowing the solid Schiff base to hydrolyze within the wellbore, releasing the degradation accelerator; and allowing the degradation accelerator to degrade the degradable diverting agent.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b")

disclosed herein is to be understood to set forth every number and range encompassed within the broader range of values. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method, comprising:
   providing a treatment fluid comprising:
      a degradable diverting agent selected from the group consisting of: a fatty ester, a proteinous material, a degradable polymer, and any combination thereof, and
      a Schiff base comprising a reaction product of a polyamine and a carbonyl compound;
   introducing the treatment fluid into a subterranean formation;
   allowing the Schiff base to hydrolytically release the polyamine; and
   at least partially degrading the degradable diverting agent with the polyamine through aminolysis or base-mediated hydrolysis.

2. The method of claim 1, wherein the degradable diverting agent comprises a degradable aliphatic polyester.

3. The method of claim 1, wherein the degradable diverting agent comprises polylactic acid.

4. The method of claim 1, further comprising allowing the degradable diverting agent to divert at least a portion of a fluid in the subterranean formation.

5. The method of claim 1, wherein the Schiff base is water insoluble.

6. The method of claim 1, wherein allowing the Schiff base to hydrolytically release the polyamine comprises allowing the Schiff base to hydrolyze and generate the polyamine.

7. The method of claim 1, wherein the Schiff base is in up to a 1:1 ratio with the degradable diverting agent by weight.

8. The method of claim 1, wherein the Schiff base comprises a compound characterized by formula:

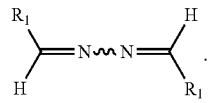

9. The method of claim 1, wherein the Schiff base comprises bis(salicylidene) ethylene diamine.

10. The method of claim 1, wherein the treatment fluid further comprises water.

11. A method, comprising:
   introducing into a wellbore penetrating a portion of a subterranean formation a proppant-carrying fracturing fluid at or above a pressure sufficient to create or enhance one or more fractures in the subterranean formation, wherein the fracturing fluid comprises a degradable diverting agent and an inactive degradation accelerator,
      wherein the degradable diverting agent is selected from the group consisting of: a fatty ester, a proteinous material, a degradable polymer, and any combination thereof, and
      wherein the inactive degradation accelerator comprises a Schiff base comprising a reaction product of a polyamine and a carbonyl compound; and
   allowing the inactive degradation accelerator to hydrolyze within the wellbore, releasing the polyamine,
      wherein the polyamine at least partially degrades the degradable diverting agent through aminolysis or base-mediated hydrolysis.

12. The method of claim 11, wherein introducing the proppant-carrying fracturing fluid further comprises using one or more pumps to direct the proppant-carrying fracturing fluid into the wellbore.

13. The method of claim 11, wherein the Schiff base comprises a compound characterized by the formula:

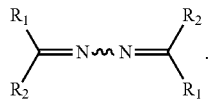

14. The method of claim 11, wherein the Schiff base comprises bis(salicylidene) ethylene diamine.

* * * * *